United States Patent Office 3,543,538
Patented Dec. 1, 1970

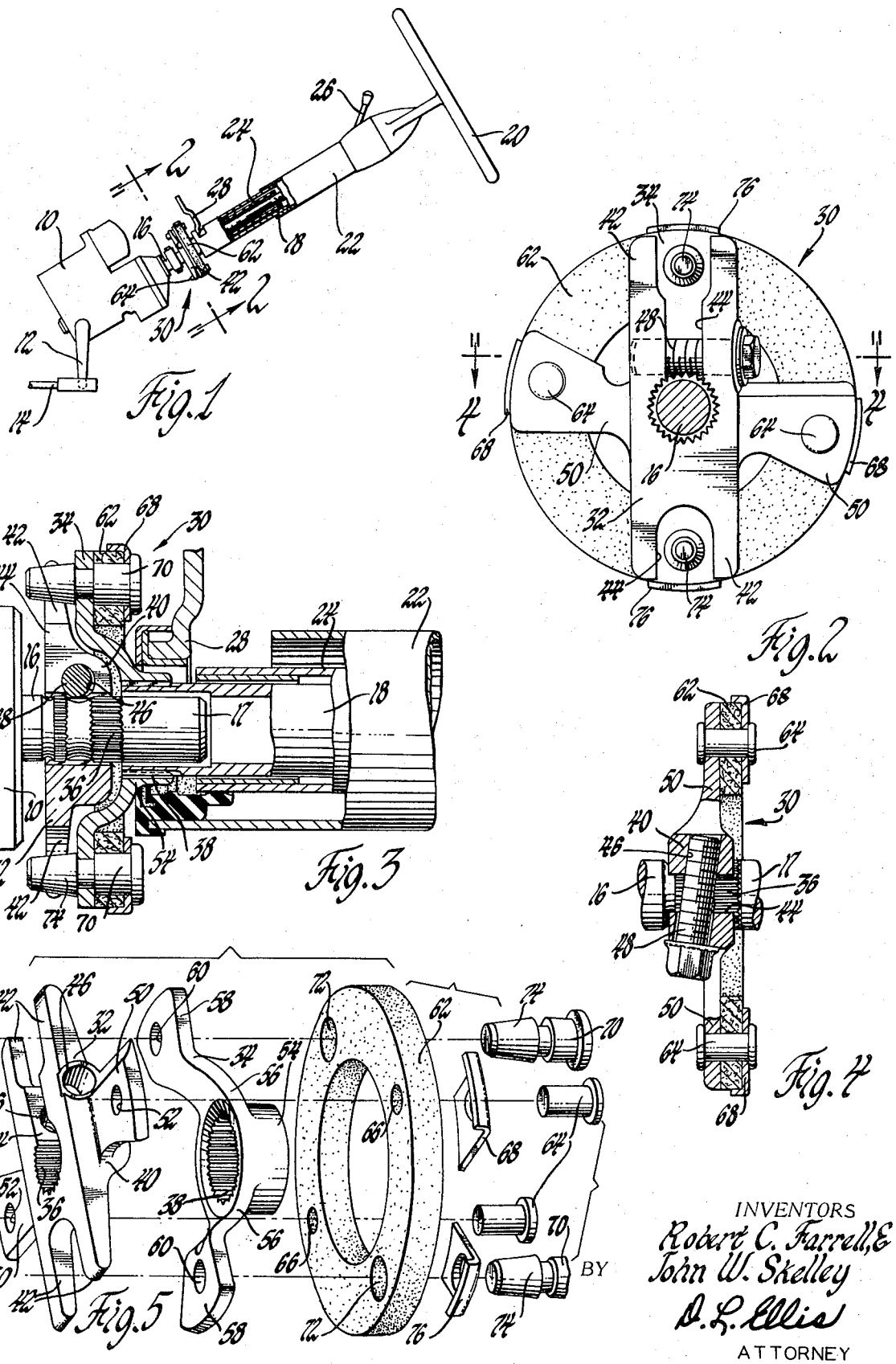

3,543,538
FLEXIBLE COUPLING
Robert C. Farrell and John W. Skelley, Saginaw, Mich., assignors to General Motors Corporation, Detroit, Mich., a corporation of Delaware
Filed May 7, 1969, Ser. No. 822,535
Int. Cl. F16d 3/78
U.S. Cl. 64—13                    2 Claims

ABSTRACT OF THE DISCLOSURE

A flexible coupling for automotive vehicle steering shaft assemblies constructed for optimum compactness of size in the axial dimension and including immediately juxtaposed nested first and second coupling members, at least one of the members being provided with radial connecting portions having axial offset over the other coupling member to lie in the same transverse plane with connecting portions thereof, and the two coupling members being flexibly interconnected by an elastomeric ring located at one side of the assembly and attached to the planar related connecting portions.

---

One feature of this invention is that it provides an improved flexible coupling for connecting a pair of shafts for unitary movement. Another feature of this invention is that it provides such a flexible coupling assembly wherein the arrangement of the two coupling members is such that optimum axial compactness is attained, one of the coupling members being formed for nesting of the other therewith and with connecting portions axially offset to lie in the same transverse plane as the connecting portions of the other member, flexible interconnection between the members being had through an elastomeric coupling ring located at an endmost relation in the assembly and attached to the connecting portions of the two coupling members.

These and other features and advantages of the invention will be readily apparent from the following description and from the drawings in which:

FIG. 1 is a partially broken away elevational view of a vehicle steering system including a flexible coupling according to this invention;

FIG. 2 is an enlarged sectional view taken generally along the plane indicated by the line 2—2 of FIG. 1;

FIG. 3 is an enlarged partially broken away view of a portion of FIG. 1;

FIG. 4 is a partially broken away sectional view taken generally along the plane indicated by the line 4—4 of FIG. 2; and FIG. 5 is an exploded perspective view of the flexible coupling.

Referring now to FIG. 1 of the drawings, there is shown a portion of a conventional steering system including a steering gear 10 having a pitman arm 12 operably connected to the steering linkage, indicated generally at 14, which is tied to the dirigible wheels of the vehicle. The input shaft section 16 of steering gear 10, seen best in FIG. 3, is adapted to be connected to a steering shaft 18 extending from adjacent the steering gear into the passenger compartment of the vehicle and carrying at its upper end in known manner a steering wheel 20. As is conventional, an energy absorbing mast jacket 22 surrounds and rotatably supports the steering shaft and as indicated in FIG. 3, the support jacket may also rotatably support concentrically about steering shaft 18 a shift tube 24 operated by the usual shift bowl and lever 26 to control the lever system, indicated at 28, of a conventional transmission shift apparatus.

The flexible coupling of this invention, indicated generally at 30, is provided to drivingly connect the lower end of steering shaft 18 with the input shaft 16 of steering gear 10. Referring to FIGS. 2, 3 and 5, the coupling 30 includes a pair of coupling members 32 and 34 nonrotatably mounted to the input shaft 16 and steering shaft 18 respectively by spline connections 36 and 38, a pilot extension 17 of the input shaft being received with clearance within tubular end portion of the steering shaft. The coupling member 32 on the input shaft is of generally flat construction including a main body portion 40 of sufficient thickness for suitable design strength in torsion on the splines 36 and having extending therefrom radially oppositely directed abutment formations 42 each including a central slot for a purpose later to appear. The body portion 40 is slotted at 44 and apertured at 46 to accommodate tightening or clamping of the coupling member 32 at splines 36 on the input shaft through tightening of a bolt 48 threadedly engaged in the body portion at one of the aligned apertures 46. The coupling member 32 further includes a pair of radially oppositely extending connecting flanges 50 disposed generally at perpendicular relationship with the abutment formations and each including a pin aperture 52.

The other coupling member 34 also includes a main body portion 54 having a central bore carrying the splines 38 with a pair of ear extensions 56 formed in generally bell-like shape to accommodate the body portion 40 of coupling member 32 in a nesting relation therewith. From each ear 56 extends a connecting flange 58 each having a pin aperture 60. A flexible coupling ring 62 constructed of fabric or otherwise reinforced rubber or other elastomeric material overlies the body portion 54 of coupling member 34 remote from coupling member 32 and is adapted for limitedly flexible interconnection of the coupling members. Such connection is accomplished by use of a pair of rivet pins 64 inserted through a pair of apertures 66 in ring 62 and apertures 52 and headed over on the remote side of the flanges 50 of coupling member 32, FIGS. 2 and 4. Reinforcing plates 68 over the other headed end of the pin 64 rigidify the connection thus established. At coupling member 34, ring 62 is attached through use of a pair of larger rivet pins 70 received within apertures 72 in the ring and seated on flanges 58 and extending through the apertures 60 thereof to be headed over on the remote side of the flanges with a generally conically shaped stop head 74. Another pair of reinforcing plates 76 underlie one set of heads of the rivet pins 70.

With the coupling thus assembled, the flexible ring 62 is rigidly connected at generally 90° spaced locations alternately to a flange 50 and a flange 58, and the stop heads 74 are generally centrally located in the slots 44 of the abutment formations 42 of coupling member 32. The flexible ring 62 is intended to be in a substantially relaxed state in this assembled position, with limited rotational lost motion being available between the stop heads and the edges of the slots 44. In normal steering conditions, the flexible ring 62 provides for torque transmission through the coupling members between steering shaft 18 and input shaft 16 while still permitting a sizable degree of elastic flexure for dampening of structure borne vibrations against transmission between the connected shafts. Further, a significant degree of longitudinal separation is elastically accommodated by the ring 62 as well as some amount of axial misalignment limited by the clearance between the extension 17 of the input shaft 16 within steering shaft 18.

In those conditions in which large amounts of steering torque must be applied through steering shaft 18 to actuate the steering gear, as in the situation of fluid power failure where steering gear 10 is of the power assisted type, relative rotation on the order of a few degrees between the steering and input shafts causes engagement between stop heads 74 and abutment formations 42 to establish direct driving connection after corresponding deformation of the elastomeric ring 62.

It will be appreciated that the flexible coupling disclosed herein provides for optimum axial compactness in the entire assembly due to the axial offsetting provided in the connecting flanges of one, or alternatively both of the coupling members, locating them in a nested relationship and placing the connecting flanges within a common plane. Thus, it is only the added thickness of the elastomeric ring 62 over the planar related flanges contributing to the total axial dimension of the radially extending portions of the coupling, as distinguished from prior assemblies wherein the elastomeric disc intervenes between the coupling members and adds to both their axial thicknesses in these portions. Accordingly, the improved flexible coupling may be utilized where engine compartment space is at a premium, particularly in the area between the steering gear 10 and whatever firewall or other body structure lies adjacent the gear.

Having thus described the invention, what is claimed is:

1. In a flexible coupling for connecting a pair of axially aligned shafts for unitary movement and of the type including first and second coupling members each having a main body portion connected to a respective shaft and connecting portions extending radially of the shaft axis from said body portion, said coupling members being connected by a flexible member attached to the connecting portions of both said members, the improvement which comprises constructing said coupling with said first and second coupling members in immediately juxtaposed relationship and constructing at least one of said coupling members to have said connecting portions thereof extend radially with an axial offset from the main body portion thereof, the main body portion of the other said coupling member being nested generally within the axial offset of said at least one coupling member and having its connecting portions lying generally in the same transverse plane with the connecting portions of said at least one coupling member, said flexible member being located axially to one side with respect to both said nested coupling members and being attached to the generally planar related coupling portions of said coupling members.

2. In a vehicle steering shaft assembly including first and second steering shaft sections adapted for unitary rotation, a flexible coupling comprising, a first coupling member including a generally flat main body portion nonrotatably connected to the first of said shaft sections and including radially oppositely extending connecting portions located in a common transverse plane, a second coupling member including a main body portion of generally bell-like shape receiving the main body portion of said first coupling member and including at one axial extremity a pair of radially oppositely extending connecting portions located in said transverse plane of said connecting portions of said first coupling member, a flexible coupling ring of generally elastomeric material located adjacent said main body portion of said second coupling member at the side thereof remote from said first coupling member and engaged with the connecting portions of said first and second coupling members, means attaching said ring to the connecting portions of said first and second coupling members, the attaching means between one of said coupling members and said ring including positive rotation transmitting stop means extending generally parallel the axis of said shafts from such one coupling member into cooperating relationship with abutment formations extending radially from the main body portion of the other of said coupling members located axially spaced from said connecting portions thereof.

References Cited
UNITED STATES PATENTS

| 1,775,556 | 9/1930 | Hewel | 64—13 |
| 3,477,307 | 11/1969 | Maddox | 74—492 |

OTHER REFERENCES

German printed application No. 1,016,984, Oct. 3, 1957, Gavnitz et al.

FRED C. MATTERN, JR., Primary Examiner

R. HEALD, Assistant Examiner

U.S. Cl. X.R.

74—492